(12) United States Patent
Magnus et al.

(10) Patent No.: US 7,659,972 B2
(45) Date of Patent: Feb. 9, 2010

(54) RAIL MEASUREMENT SYSTEM

(75) Inventors: Steven Magnus, Northport, NY (US); Daniel Magnus, Greenlawn, NY (US)

(73) Assignee: KLD Labs, Inc.

( * ) Notice: Subject to any disclaimer, the term of this patent is extended or adjusted under 35 U.S.C. 154(b) by 0 days.

(21) Appl. No.: 12/229,244

(22) Filed: Aug. 21, 2008

(65) Prior Publication Data

US 2009/0073428 A1 Mar. 19, 2009

Related U.S. Application Data

(60) Provisional application No. 60/965,789, filed on Aug. 22, 2007.

(51) Int. Cl.
- *G06K 9/00* (2006.01)
- *G01N 21/00* (2006.01)
- *G01B 11/30* (2006.01)
- *G01B 11/14* (2006.01)

(52) U.S. Cl. .................... 356/237.1; 356/601; 356/614; 356/625; 382/141

(58) Field of Classification Search ......................... None
See application file for complete search history.

(56) References Cited

U.S. PATENT DOCUMENTS

| | | | | |
|---|---|---|---|---|
| 4,301,373 A * | 11/1981 | Sjodin | .................... | 250/559.06 |
| 7,036,232 B2 * | 5/2006 | Casagrande | .................. | 33/1 Q |
| 7,463,348 B2 * | 12/2008 | Chung | ..................... | 356/237.1 |
| 2006/0017911 A1 * | 1/2006 | Villar et al. | ................. | 356/4.01 |

FOREIGN PATENT DOCUMENTS

JP 08247733 A * 9/1996

* cited by examiner

*Primary Examiner*—Gregory J Toatley, Jr.
*Assistant Examiner*—Gordon J Stock, Jr.
(74) *Attorney, Agent, or Firm*—Thomas A. O'Rourke; Bodner & O'Rourke, LLP

(57) ABSTRACT

A system and method of continuously measuring the profile of a rail in real time is disclosed. The rail which the profile is obtained in position on a track bed, The system includes a means for transmitting a beam of light at a selected wavelength onto the rail to illuminate a portion of the rail. The light is preferably a beam of laser light. A digital image of said illuminated portion of said rail is recorded. The digital image is manipulated to filter all light except for the selected wavelength. Rail wear is determined from the digital image created by the selected wavelength of light.

26 Claims, 6 Drawing Sheets

RAIL MEASUREMENT SYSTEM

CROSS REFERENCE TO RELATED PATENT APPLICATION

This application claims the benefit of the filing date of U.S. provisional patent application Ser. No. 60/965,789 filed on Aug. 22, 2007, the disclosures of which are incorporated herein by reference.

BACKGROUND OF THE INVENTION

1. Field of the Invention

The present invention relates to a rail measurement system used to provide real-time dimensional data and high resolution rail profiles. This data is acquired and processed in real-time for assessing and monitoring conductor and running rail profile and dimensions. The system is a high speed machine vision system utilizing structured laser light sources to illuminate the rail head and high resolution digital cameras to capture the rail images. The images are analyzed to calculate the required rail measurements.

2. Description of the Prior Art

Over time, due to the friction and stress between the train wheel and the rail, a train traveling along a track will eventually cause the rail to wear and the positional geometry between the running rails will move. Along with the two running rails, generally railways employ a third rail known as a conductor, power, or third rail. The conductor rail is a continuous rigid conductor running alongside the railway track or between the rails. The conductor rail provides electricity to power a railway. Conductor rail systems generally supply direct current to power the trains. The conductor rail is usually located outside the two running rails, but occasionally runs between them. The electricity is transmitted to the train by means of a sliding shoe, which is held in contact with the rail. Because the shoe-contacts the rail during operation of the train, the conductor rail is also subject to many of the same effects that cause rail wear and positional geometry problems.

OBJECTS OF THE INVENTION

An objective of the present invention is to administer testing of the rails without contacting the rails.

Another objective of the present invention is to safely test the rails without endangering the device's operators.

Another objective of the present invention is to provide faster, less expensive and more robust testing.

Another objective of the present invention is to accurately measure the conductor rail and running rails at track speeds.

A further objective of the present invention is to easily locate conductor rail or running rail track sections that exceed rail condemning limits.

A still further objective of the present invention is to store all measurements and locations for post analysis.

Another objective of the present invention is to allow for continuous day or night testing.

A further objective of the present invention is to easily integrate with track geometry, Hi-Rail, maintenance and revenue service vehicles.

A still further objective of the present invention is to operate around regular rail traffic without shutting down or slowing down entire stretches of track.

SUMMARY OF THE INVENTION

The present invention is a non-contact machine vision approach to monitor and measure the positional geometry and wear of the conductor and running rail that can be made from a moving railway vehicle. In one example, a laser/camera non contact measuring means can be used. This invention allows the conductor and running rail to be measured without the need for personnel on the track. Additionally by mounting this test equipment to the railway vehicle, testing of the track can be performed under loaded conditions for maximum positional movement.

The present invention is a real-time rail measurement system. The data is acquired and processed in real-time for assessing and monitoring the relative running rail/conductor rail lateral and vertical position for quality control of running rail/conductor rail geometry. The present invention performs a detailed rail profile analysis in real-time with each rail sample. The invention computes a variety of rail dimensional measurements. Once these key measurements have been computed, the invention can then compare these values to "new rail" measurements and compile a Rail Wear Analysis Report for any given segment of track. During a rail inspection test run, this report is immediately available for use by track supervisors to prioritize their maintenance. Also, all information is stored internally and can be shared with other departments in a railway for other applications including rail forecasting, rail grinding planning, maintenance planning and research and development.

The technology deployed is a machine vision system that may include but is not limited to a camera and a laser light source that is installed on a railway vehicle and is optimized to work in an outdoor environment. The camera and laser are positioned at an angle relative to the conductor or running rail to capture a profile of the corresponding area of interest.

The high resolution digital cameras capture the shape or profile of the rail illuminated by the laser. After the image has been acquired, the central computer processes the video information to determine the extent of rail wear. To accomplish this task, the system preferably applies four stages of processing with each acquired rail image: 1) Filtering the digital image, 2) Transformation of rail image to real-world coordinates; 3) Rail dimensional computation; 4) Rail wear analysis.

The first state in the processing filters the image by allowing only light transmitted at the same wavelength as the laser beam to remain in the image and removing the other light. The second stage in the processing of the rail image is the transformation to real-world coordinates. Each digital camera views the rail at a compound angle and introduces a perspective when viewing the rail, these angles must be geometrically removed by performing a three-axis geometric transformation from the digital camera plane to the rail plane. Once the transformation is completed for each rail profile data point, the actual rail dimensions can then be computed.

Having obtained the X-Y coordinates, the system can perform the rail measurements. To accomplish this task, the system will first locate the base and web of the rail as a reference for this is a non wear area. Once located the midpoint of the rail is calculated at the base. This midpoint along with a series of midpoints calculated along the web determines the centerline of the rail. The slope of the centerline is then calculated and reported as the rail inclination measurement. This centerline is also projected all the way up to the to the top of rail. This line segment represents the total height of the rail. Following this computation, the analysis program then comes down from this top-of-rail point to the gauge point (typically ⅝" down) and then projects a line segment left and right and computes the center to field side and gauge side. After the width computation, the gauge face angle is computed by determining the slope of the gauge face around the gage point. Furthermore, the distance between the gage point on each rail is then used to determine the track gauge.

The measurement of the inclination rail under dynamic conditions provides railways a measurement tool to detect deteriorated sleepers and missing hardware. By measuring the slope of the centerline using the system allows for the real-time analysis of this parameter. The system can also dimensionally measure the amount of lip (metal flow) on the gauge side and field side of the rail. This is determined by searching above the gauge point for a maximum.

The system performs all of the discussed measurements in real-time to allow for the immediate display and reporting on-board the track inspection vehicle. As the system is collecting rail data the operator uses the user interface to view the left and right rail and the associated measurements.

The User Interface Display allows the user to view the left and right rail profiles, the rail measurements and the location of each measurement during a test run. The interface also provides a system status bar which indicates the performance of the entire system. All interaction between the user and the system is performed through this Windows "User Friendly" interface.

The unique feature of the system is that it computes the rail measurements in real-time. This feature allows the system to generate real-time Rail Wear Analysis Report during a test run. By providing these real-time reports, railroad personnel can quickly identify sections of track that require immediate attention.

The system stores rail measurements and rail profile data to the system's internal hard drive during a test run. After a test run, the system can archive this information in a database. This information can then be used for input to track maintenance and planning software.

The final data output capability of the system is via a network or serial communications. The system can be networked to allow remote operation of the system. All measurements and rail exceptions are also made available through this communication link. This allows the real-time data to be integrated into a test vehicle's main computer exception report. This configuration is typically found on vehicles that already have a central computer installed.

The system generally comprises a central control, two sensor heads and laser cutoff switches. The central control generally resides inside the vehicle while the sensor heads are preferably attached to the bottom of the vehicle, one generally centered over each rail. A laser cutoff switch enclosure is mounted on each side of the vehicle near each sensor head.

The sensor heads, while being attached to the bottom of the vehicle, also house the image acquisition equipment. Generally each sensor head has two sets of image acquisition equipment located on opposite sides of the sensor head and wheel. The image acquisition equipment is comprised of a laser and a high resolution digital camera configuration. The system uses the combination of the laser and high speed camera to provide dimensional data and high-resolution rail profiles of both the running rail and conductor rail at track speeds.

In one preferred embodiment, one set of image capturing equipment is angled to capture a profile of the gauge side of the running rail while the second set of image capturing equipment is angled to capture the profile of the conductor rail. Using this configuration, the system can calculate the conductor rail vertical position, conductor rail lateral position, conductor rail/running rail profile, track gauge, conductor rail temperature and conductor rail wear.

In another preferred embodiment, both sets of image capturing equipment are angled towards each side of the running rail. Using this configuration, the system can calculate the rail profile, new rail size identification, rail height, vertical wear, rail width, lateral wear, lip flow, rail inclination (rotation), gauge of the running rail, and the gauge face angle.

In a third preferred embodiment, the system comprises four sensor heads instead of two. Only one set of image capturing equipment resides on each sensor head. The sensor heads are mounted underneath the vehicle in pairs over the left and right rails. Each pair of sensor heads has one sensor head angled to capture the profile of the conductor rail and the other sensor head angled to capture the profile of the running rail.

In each of the preferred embodiments, all cameras and lasers are fixed to one another so any positional movement over the camera field of view represents track movement and can be measured.

The present invention's central control is comprised of the following components: the computer system, and an electronics control unit. In addition, a monitor, keyboard, and mouse are connected to the computer system. The computer system controls the operation of the system. It preferably houses a quad port gigabit Ethernet card, with each port acting as an interface to each sensor head camera. The electronics control unit houses the electronics that controls the sensor head temperature and humidity, the thermoelectric cooler controllers that maintain the laser temperature generally within about $+/-1°$ C., the laser safety cutoff mechanism, various power supplies, the interface to the encoder input and the interface to the computer system.

The System Control Board governs the operation of the electronics and is responsible for monitoring the environmental status of the system. During system operation, the system control board receives commands from the computer system. Once the system is running the system control board controls the laser illumination of the rail and image acquisition by the camera.

The system may be configured to sample the rail profiles utilizing a number of different methods. One such method is distance sampling using a pulse or encoder scheme. Installed on a track inspection vehicle is an encoder wheel attached to the axle of one of the trucks. As the vehicle travels down the track, pulses are sent from the encoder wheel signifying distance traveled. This allows the invention to synchronize each rail measurement with a known location. After a preset distance, determined by counting the number of wheel encoder pulses, the invention notifies the sensor heads to flash the lasers and acquire a video image. This sampling method may be configured to capture rail samples after a user defined number of pulses between acquisitions with the number of pulses per foot traveled defined by the user. Another alternative is time interval sampling. This sampling method may be configured to capture rail samples after a user defined number of milliseconds between acquisitions.

A heating system maintains the internal temperature of each sensor head. The system insures that the sensor head air temperature will not fall below freezing.

Each sensor head is equipped with two moisture removal plugs to absorb moisture from the air inside the sensor head. Each sensor head also has a color indicator card to provide a relative humidity value inside the sensor head.

The rail is illuminated and imaged by the sensor head through recessed windows. Each sensor head has four windows. They are made of high strength optical quality glass and utilize an antireflective coating designed for the particular lasers being used.

Laser cutoff switch enclosures are mounted on each side of the vehicle directly above each sensor head. These enclosures show the status of the laser system as well as provide a means for deactivating it.

DETAILED DESCRIPTION OF THE DRAWINGS

Figure 1:
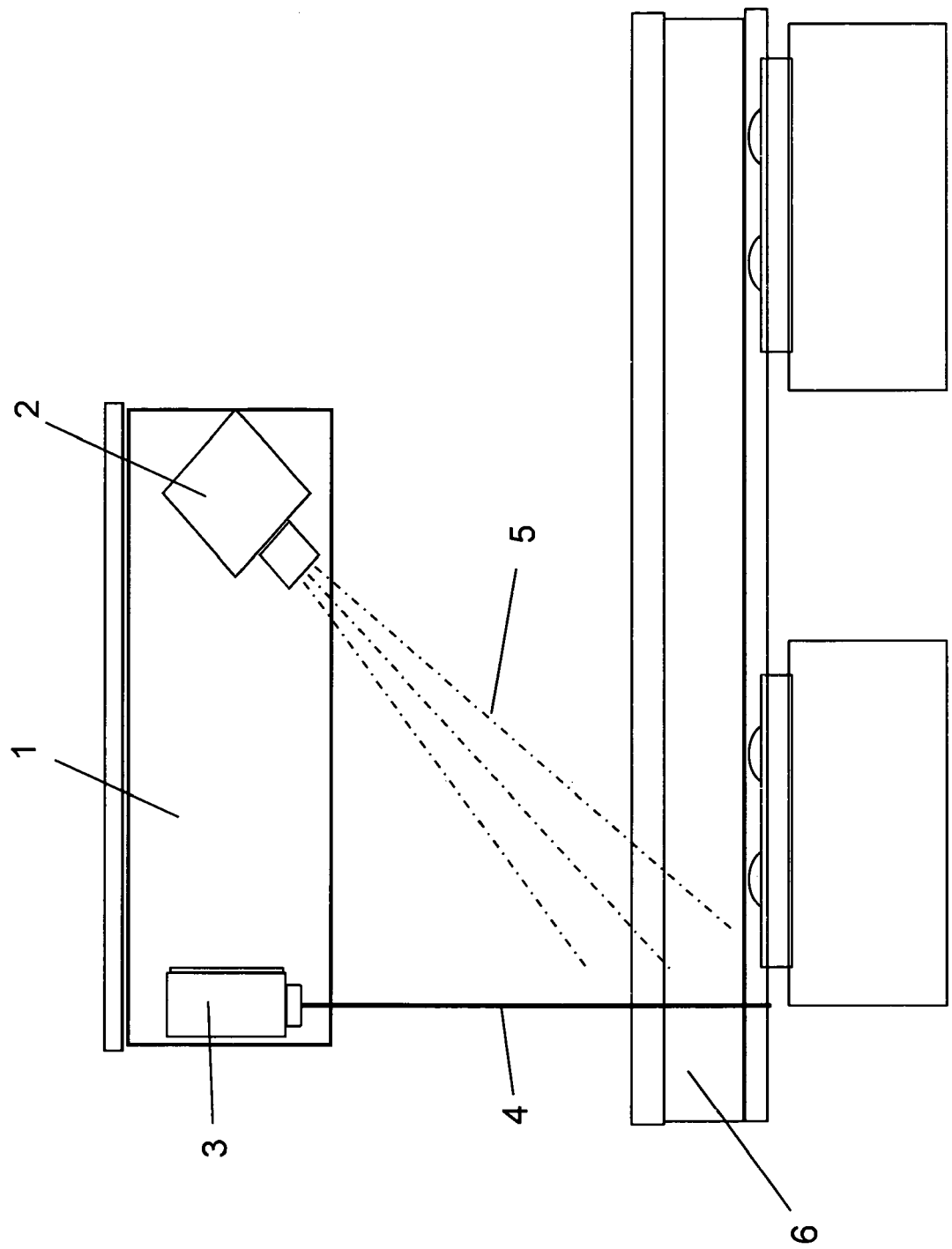
FIG. 1 is a side view of the image acquisition equipment capturing a rail profile.

The present invention has numerous embodiments. While it is possible to imagine numerous configurations for the present invention, three preferred embodiments are depicted in the figures. The differences in configuration generally occur in the arrangement of the sensor heads 1 and the image acquisition equipment housed inside the sensor heads 1. Generally each sensor head 1 has two sets of image acquisition equipment located on opposite sides of the sensor head 1 and wheel 9. However, one of the configurations only has one set of image acquisition equipments inside each sensor head 1. It is possible to imagine other configurations of the present invention including different number of sensor heads 1 and different numbers of image acquisition equipment located in the sensor heads 1. However, in each of the preferred embodiments, all cameras 2 and lasers 3 are fixed to one another so any positional movement over the camera 2 field of view represents track movement and can be measured.

The image acquisition equipment residing in the sensor heads 1 is comprised of a laser 3 and a high resolution digital camera 2 configuration. The present invention uses this combination of a laser 3 and a high speed digital camera 2 to provide dimensional data and high-resolution rail profiles of both the running rail 7 and conductor rail 8 at track speeds. These profiles are then analyzed to calculate different measurements that help determine the current state of the rails.

Each sensor head 1 has one or more lasers 3 that generate a momentary plane of laser light 4 that illuminates the cross section of the rail 6. The laser 3 is used as a light source to illuminate the running and/or conductor rail shape so that the digital camera 1 may capture a profile of the illuminated rail 6. One of the reasons a laser 3 is used is because the light released is monochromatic. Since the laser light 4 is essentially one wavelength, processing of the digital profile is simplified when all of the other wavelengths are filtered out of the profile leaving only the cross section of the rail illuminated by the laser beam 4. In addition to the monochromatic characteristic, the light released is also coherent and directional projecting as a tight beam that exists in a single plane. This momentary plane of laser light 4 illuminates only a cross section of the rail 6. Also, the light released is a strong and concentrated beam. The strong, concentrated beam allows the device to pulse for a much shorter duration and thus limits the exposure to sunlight and freezes the motion of the vehicle as it travels down the track. Digital cameras 2 capture images of the illuminated rails 6. The electronic shutter is tuned to the duration of the laser light 4 pulse to minimize the amount of stray light captured by the camera 2. After the digital camera 2 captures the image, a profile of the cross section of the rail is produced and analyzed. These images are then passed through a filter that allows only the portion of the rail 6 illuminated by the laser light 4 to remain in the image while filtering out the rest of the image. The images are then processed and calibrated to remove the camera 2 perspective.

After image data is filtered and processed, a computer calculates the relative position of the rail and several wear parameters. Additionally, any rail rotation or wear on the surface is also measured and reported. The system is designed to measure the full cross-sectional rail profile from the base up to the top-of-rail surface.

FIG. 1 shows a side view of the present invention. FIG. 1 represents all of the possible configuration side views for the present invention since the laser is a plane and illuminates only a cross section of the rail 6. In order for the cross section of the rail to be illuminated, the plane of laser light 4 must be perpendicular to the direction of the rails. The laser 3 is placed at one end of the sensor head 1. The camera 2 is position at the opposite end of the sensor head 1 with the lens of the camera 1 positioned at an angle that will capture 5 the profile of the rail 6.

Figure 2:
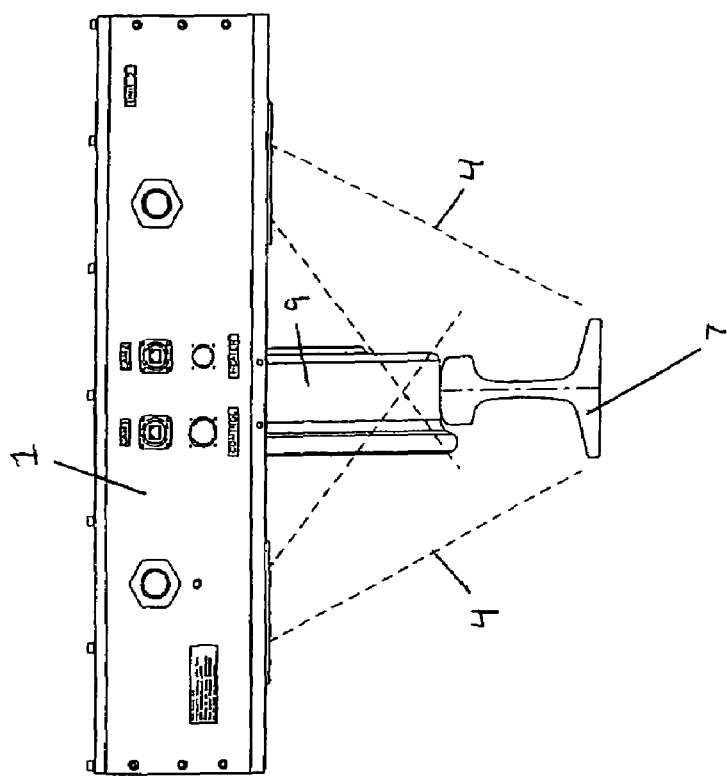
FIG. 2 is a front view of the dual sensor head configuration with the image acquisition equipment capturing a running rail profile.
Figure 2:
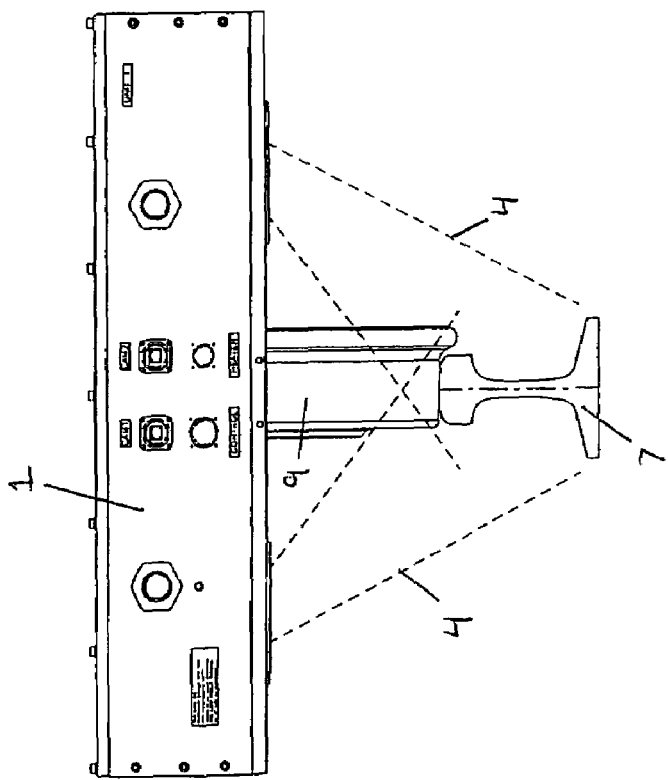
Figure 3:
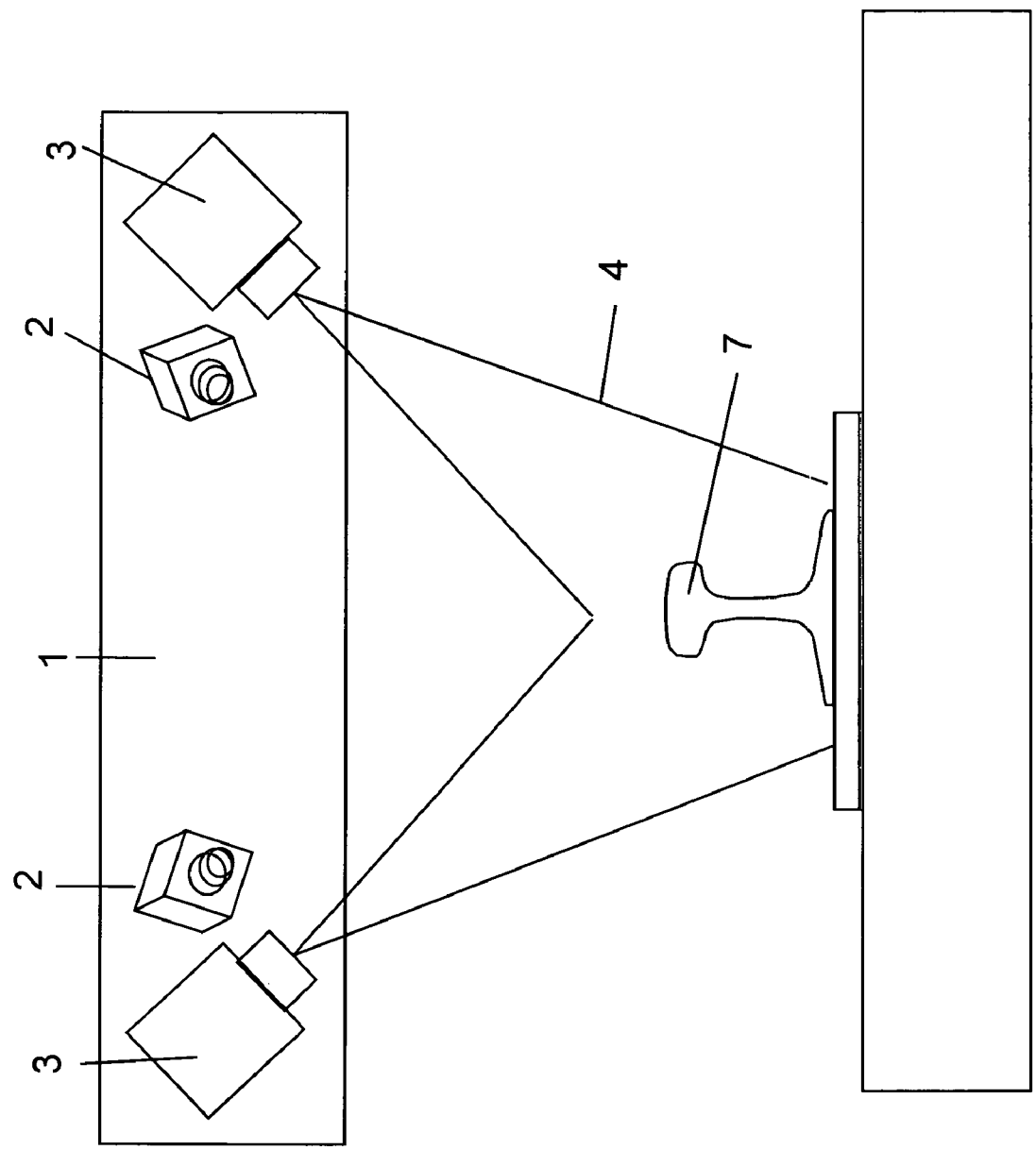
FIG. 3 is a front view of a sensor head with the image acquisition equipment capturing a running rail profile.

FIGS. 2 and 3 depict a front view of one preferred embodiment of the present invention. In the preferred embodiment represented in FIGS. 2 and 3, both sets of image capturing equipment are angled towards each side of the running rails. FIG. 2 depicts both sensor heads 1 operating over the running rails 7. Each set of image capturing equipment is placed at opposite ends of the sensor heads 1. One set of the image capturing equipment is positioned on the gauge side of the rail while the other set is positioned on the outer side of the rail. Each sensor head 1 is centered on the rail 7. A beam of light 4 created by the laser 3 is depicted in the figures to portray how a rail profile is captured by the image acquisition equipment. Beam overlap, as seen in FIG. 2 does occur. To prevent the overlap from affecting the captured rail profile, each beam 4 operates at a different wavelength. During the filtering process to create the profile, each image is filtered at the corresponding beam frequency to remove any overlap from the opposite beam 4. FIG. 3 displays both cameras 2 that reside inside a sensor head 1. Using this configuration, the system can calculate the rail profile, new rail size identification, rail height, vertical wear, rail width, lateral wear, lip flow, rail inclination (rotation), gauge of the running rail, and the gauge face angle.

Figure 4:
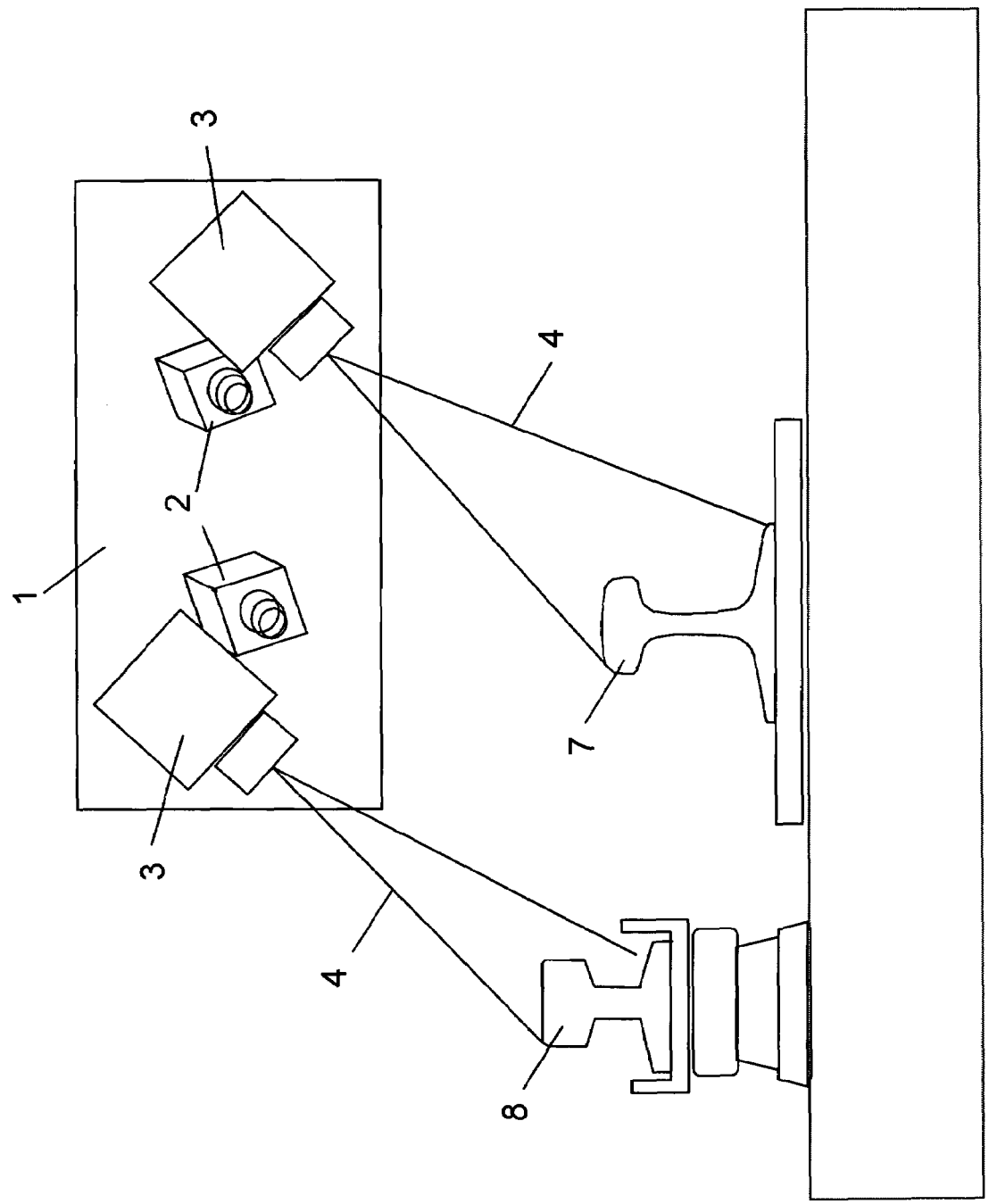
FIG. 4 is a front view of a sensor head with the image acquisition equipment capturing a conductor rail profile.
Figure 5:
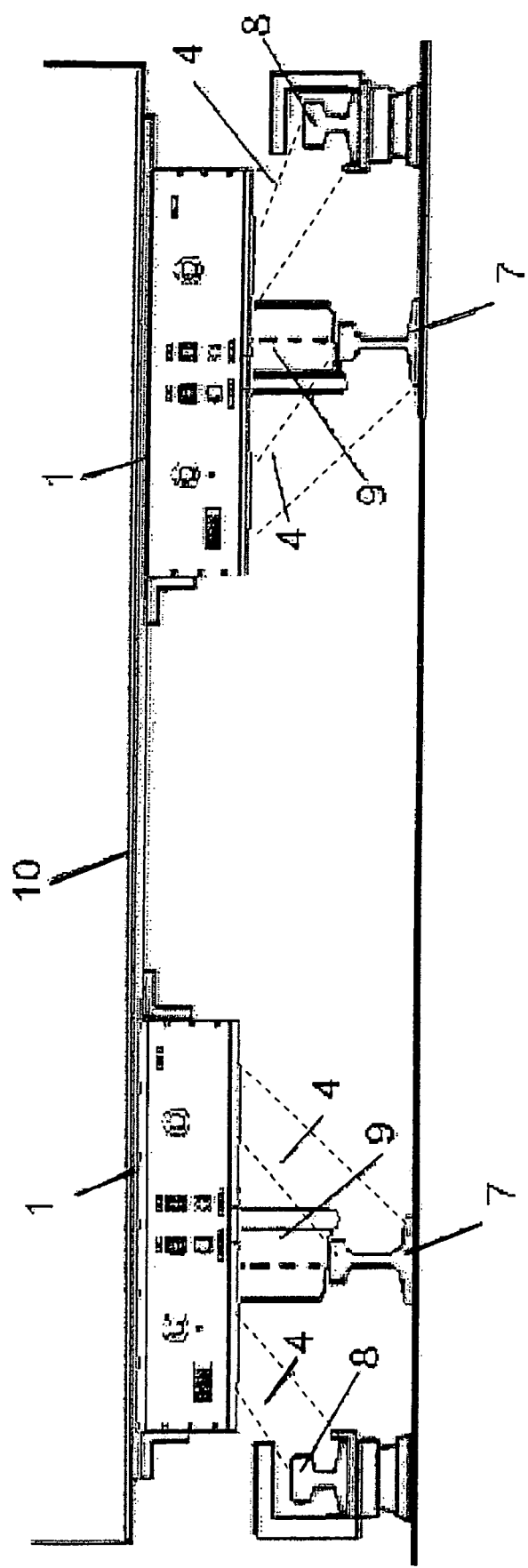
FIG. 5 is a front view of the dual sensor head configuration with the image acquisition equipment capturing a running rail and conductor rail profile.

FIGS. 4 and 5 depict another preferred embodiment of the present invention. In this embodiment two sensor heads 1 centered over each running rail 7. Each sensor head 1 contains two sets of image capturing equipment. One set of image capturing equipment is angled to capture a profile of the gauge side of the running rail 7 while the second set of image capturing equipment is angled to capture the profile of the conductor rail 8. Using this configuration, the system can calculate the conductor rail vertical position, conductor rail lateral position, conductor rail/running rail profile, track gauge, conductor rail temperature and conductor rail wear.

Figure 6:
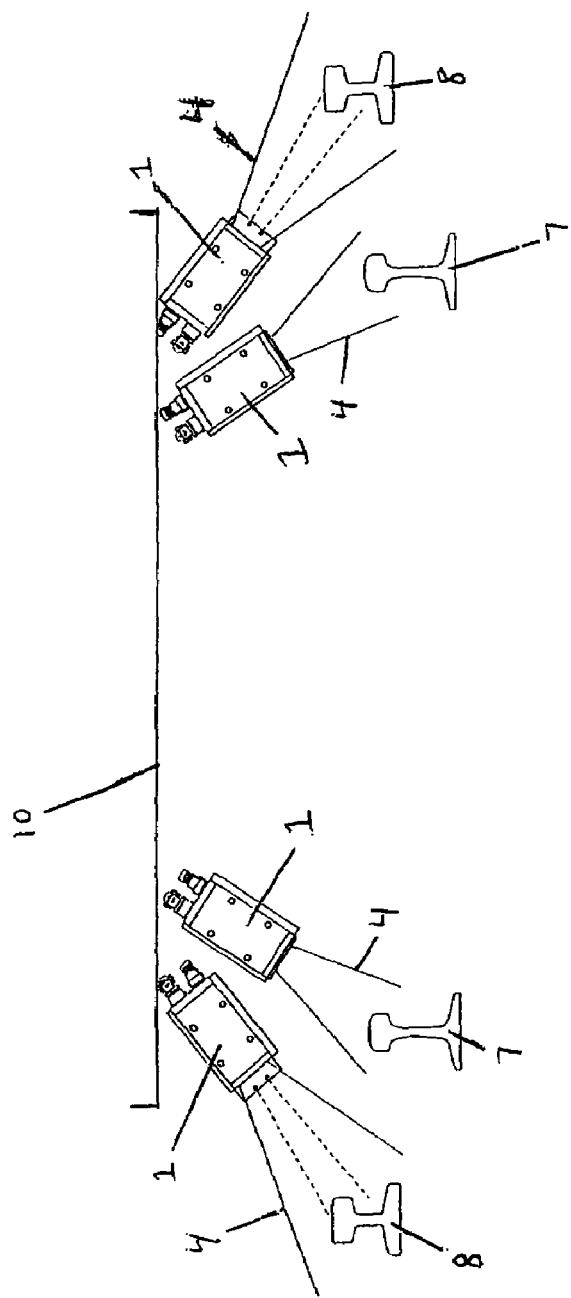
FIG. 6 is a front view of the quad sensor head configuration with the image acquisition equipment capturing a conductor and running rail profile.

FIG. 6 shows a third preferred embodiment of the present invention. In this embodiment, four sensor heads 1 are mounted to the bottom of the vehicle 10 instead of two. Only one set of image capturing equipment resides on each sensor head 1. The sensor heads 1 are mounted underneath the vehicle in pairs over the left and right running rails 7. Each pair of sensor heads 1 has one sensor head 1 angled to capture the profile of the conductor rail 8 and the other sensor head 1 angled to capture the profile of the running rail 7.

We claim:

1. A method of continuously measuring a profile of rails in real time where said rails are in position on a track bed comprising transmitting a first beam of light at a selected wavelength onto a gauge side of a running rail to illuminate a portion of said running rail, transmitting a second beam of light at a selected wavelength onto a profile of a conductor rail to illuminate a portion of said conductor rail, recording a digital image of said illuminated portions of said rails at a first and second sensor head, each of said first and second sensor heads having an image acquisition means and wherein one acquisition means is angled to capture a profile of the gauge side of said running rail while a second image acquisition means is angled to capture the profile of said conductor rail manipulating said digital images to filter all but said selected wavelengths, determining rail wear from said digital images created by the selected wavelengths of light.

2. The method according to claim 1 wherein said beams of light are monochromatic.

3. The method according to claim 1 wherein said lights are coherent and directional projecting.

4. The method according to claim 1 wherein said first beam of light has a different wavelength than said second beam of light.

5. The method according to claim 4 wherein a first camera records the digital image by said first beam of light and a second camera records the digital image created by the second beam of light.

6. The method according to claim 5 wherein the digital image recorded by the first camera is filtered at the same wavelength as the first beam of light and the digital image recorded by the second camera is filtered at the same wavelength as the second beam of light.

7. A method for providing a detailed rail profile analysis of rail samples in real-time comprising computing one or more rail dimensional measurements, obtained by at least two sensor heads wherein each sensor head has an image acquisition means being comprised of a source of laser light and a digital camera and wherein one image acquisition means is angled to capture a profile of a gauge side of a running rail while a second image acquisition means is angled to capture a profile of a conductor rail, comparing the measurements so obtained to a representative new rail measurement, compiling a rail wear analysis for said samples.

8. The method according to claim 7 wherein each camera and laser is fixed to one another so any positional movement over a camera field of view represents track movement.

9. The method according to claim 7 wherein rail samples are captured after a user defined period of time between acquisitions.

10. The method according to claim 7 wherein one or more of a conductor rail vertical position, conducted rail lateral position, conductor rail/running rail profile, track gauge, conductor rail temperature and conductor rail wear are measured.

11. The method according to claim 7 wherein a distance traveled is measured using an encoder wheel attached to an axle of a truck.

12. The method according to claim 7 wherein one or more of a rail profile, new rail size identification, rail height, vertical wear, rail width, lateral wear, lip flow, rail inclination (rotation), gauge of the running rail, and a gauge face angle can be calculated.

13. The method according to claim 11 wherein after a preset distance, determined by counting a number of wheel encoder pulses, the sensor heads activate the lasers and acquire a video image.

14. The method according to claim 12 wherein there are four sensor heads.

15. The method according to claim 14 wherein the sensor heads are mounted underneath a vehicle in pairs over left and right rails.

16. The method according to claim 15 wherein each pair of sensor heads has one sensor head angled to capture the profile of the conductor rail and the other sensor head angled to capture the profile of the running rail.

17. A method for providing a detailed rail profile analysis of rail samples in real time comprising computing one or more rail dimensional measurements obtained by at least two sensor heads wherein each sensor head has an image acquisition means and wherein one image acquisition means is angled to capture a profile of a gauge side of a running rail while a second image acquisition means is angled to capture a profile of a conductor rail.

18. The method according to claim 17 wherein each pair of sensor heads has one sensor head angled to capture the profile of the conductor rail and the other sensor head angled to capture the profile of the running rail.

19. The method according to claim 17 wherein rail samples are captured after a user defined period of time between acquisitions.

20. The method according to claim 17 wherein a distance traveled is measured using an encoder wheel attached to an axle of a truck.

21. The method according to claim 17 wherein one or more of the conductor rail vertical position, conductor rail lateral position, conductor rail/running rail profile, track gauge, conductor rail temperature and conductor rail wear are measured.

22. The method according to claim 20 wherein after a preset distance, determined by counting a number of wheel encoder pulses, the sensor heads activate the lasers and acquire a video image.

23. The method according to claim 21 wherein one or more of a rail profile, new rail size identification, rail height, vertical wear, rail width, lateral wear, lip flow, rail inclination (rotation), gauge of the running rail, and a gauge face angle can be calculated.

24. The method according to claim 23 wherein there are four sensor heads.

25. The method according to claim 24 wherein the sensor heads are mounted underneath a vehicle in pairs over left and right rails.

26. A system that continuously measures a profile of rails in real time where said rails are in position on a track bed comprising a means for transmitting a first beam of light at a selected wavelength onto a gauge side of a running rail to illuminate a portion of said running rail, a means for transmitting a second beam of light at a selected wavelength onto a profile of a conductor rail to illuminate a portion of said conductor rail, a means for recording a digital image of said illuminated portions of said rails, at a first and second sensor head, each of said first and second sensor heads having an image acquisition means and wherein one acquisition means is angled to capture a profile of the gauge side of said running rail while a second image acquisition means is angled to capture the profile of said conductor rail a means for manipulating said digital images to filter all but said selected wavelengths to determine rail wear from said digital images created by the selected wavelengths of light.

* * * * *